(No Model.)

L. HIRSCH.
WATCH MAKER'S TWEEZERS.

No. 369,182. Patented Aug. 30, 1887.

WITNESSES:

INVENTOR
Ludwig Hirsch
BY
ATTORNEYS.

UNITED STATES PATENT OFFICE.

LUDWIG HIRSCH, OF NEW YORK, N. Y.

WATCH-MAKER'S TWEEZERS.

SPECIFICATION forming part of Letters Patent No. 369,182, dated August 30, 1887.

Application filed May 9, 1887. Serial No. 237,650. (No model.)

*To all whom it may concern:*

Be it known that I, LUDWIG HIRSCH, of the city, county, and State of New York, have invented certain new and useful Improvements in Tweezers, of which the following is a specification.

This invention relates to an improved pair of tweezers for the use of watch-makers and others, which can also be used for holding the hands, pinions, gear-wheels, and other small parts of watch-movements in position for conveniently broaching or filing out the hubs or other portions of the same; and the invention consists of a pair of tweezers the spring-shanks of which are provided in the body thereof with one or more openings having tapering extension-slits.

Figure 1:
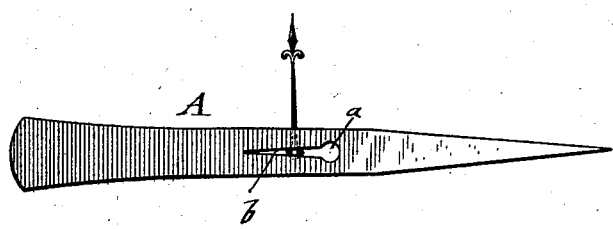
Figure 2:
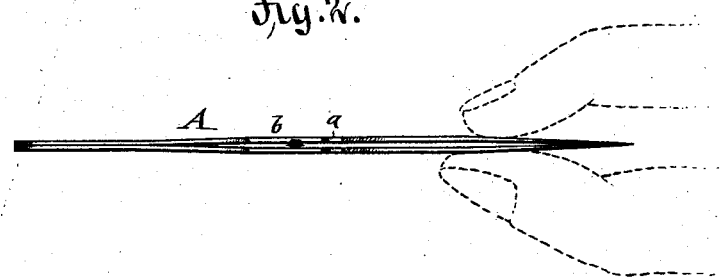
Figure 3:
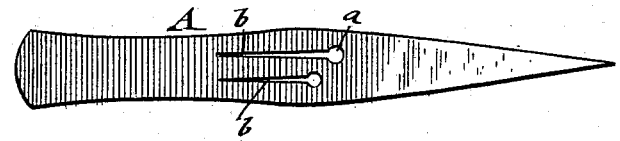

In the accompanying drawings, Figure 1 represents a top view of a pair of tweezers with my improvement, showing a watch-hand held in position thereby. Fig. 2 is a side elevation of the same. Fig. 3 is a top view of a modified construction of my tweezers.

Similar letters of reference indicate corresponding parts.

Referring to the drawings, A represents a pair of tweezers such as used by watch-makers and others for taking hold of small articles. In the body of the spring-shanks of the tweezers are arranged one or more openings, $a$, provided with tapering extension-slits $b$, said slits serving to firmly retain the hub of a hand, pinion, or other part of a watch-movement when the same has been introduced between the shanks, inserted in the opening $a$, and moved toward the end of the slit $b$ until its hub is tightly clamped by the inclined sides of the slit, as shown in Fig. 1. The spring-shanks are then tightly clamped by the fingers, as shown in Fig. 2, so that the hand, pinion, or other part is firmly held in position by the spring-shanks and the inclined slit, and thereby the inner surface of the hub readily and conveniently broached or filed, the tweezers serving the twofold purpose of taking hold of articles and of supporting smaller articles by means of the slits and shanks while being operated upon.

I am aware that tweezers have been made heretofore in which the shanks are provided with openings; but this is done with a view to make the tweezers lighter, but not to utilize such openings for the purpose of holding small articles.

Having thus described my invention, I claim as new and desire to secure by Letters Patent—

A pair of tweezers the spring-shanks of which are provided in the body thereof with one or more openings, and with a tapering slit or slits extending from said opening or openings, substantially as set forth.

In testimony that I claim the foregoing as my invention I have signed my name in presence of two subscribing witnesses.

LUDWIG HIRSCH.

Witnesses:
 PAUL GOEPEL,
 SIDNEY MANN.